(12) United States Patent
Li et al.

(10) Patent No.: US 10,592,570 B2
(45) Date of Patent: Mar. 17, 2020

(54) SELECTING CONTENT FOR PRESENTATION TO A USER OF A SOCIAL NETWORKING SYSTEM BASED ON A TOPIC ASSOCIATED WITH A GROUP OF WHICH THE USER IS A MEMBER

(71) Applicant: Facebook, Inc., Menlo Park, CA (US)

(72) Inventors: Zhen Li, Cupertino, CA (US); Li Ju, Issaquah, WA (US); Eric Hsin-Chun Huang, Foster City, CA (US); Yun Liu, Sammamish, WA (US); Chang Su, Sunnyvale, CA (US); Cassidy Jake Beeve-Morris, San Francisco, CA (US); Yuan Liang, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 372 days.

(21) Appl. No.: 15/645,799

(22) Filed: Jul. 10, 2017

(65) Prior Publication Data

US 2019/0012387 A1    Jan. 10, 2019

(51) Int. Cl.
| | | |
|---|---|---|
| *G06F 16/9535* | (2019.01) | |
| *G06F 16/9536* | (2019.01) | |
| *G06Q 30/02* | (2012.01) | |
| *G06Q 50/00* | (2012.01) | |

(52) U.S. Cl.
CPC ...... *G06F 16/9535* (2019.01); *G06F 16/9536* (2019.01); *G06Q 30/0269* (2013.01); *G06Q 50/01* (2013.01)

(58) Field of Classification Search
CPC ........ G06F 16/9535; G06F 7/026; G06F 7/08; G06F 16/9536; G06Q 30/0269; G06Q 50/01

USPC .......................................................... 707/738
See application file for complete search history.

(56) References Cited

U.S. PATENT DOCUMENTS

| | | | | |
|---|---|---|---|---|
| 7,185,065 | B1 * | 2/2007 | Holtzman | G06F 17/2745 705/36 R |
| 2005/0240580 | A1 * | 10/2005 | Zamir | H04L 67/22 |
| 2015/0149468 | A1 * | 5/2015 | Shukla | G06F 16/35 707/740 |
| 2016/0320946 | A1 * | 11/2016 | Zhao | G06F 16/248 |
| 2017/0103441 | A1 * | 4/2017 | Kolb | G06F 16/93 |
| 2017/0255681 | A1 * | 9/2017 | Giunio-Zorkin | G06F 16/24573 |
| 2018/0046708 | A1 * | 2/2018 | Stewart | G06K 9/00456 |

(Continued)

*Primary Examiner* — James Trujillo
*Assistant Examiner* — Jessica N Le
(74) *Attorney, Agent, or Firm* — Fenwick & West LLP

(57) ABSTRACT

A social networking system allows users to create and join groups in the social networking system, in which each group is associated with one or more interests shared by members of the group. To select content for presentation to a viewing user of the social networking system who is a member of a group, the social networking system may determine one or more topics associated with the group based at least in part on a classification system and on information associated with objects maintained in the social networking system that are similar to the group. The topic(s) associated with the group also may be determined based on information associated with the group, with members of the group, and/or with objects associated with the group. The social networking system may then select one or more content items associated with the topic(s) for presentation to the viewing user via a group page.

25 Claims, 4 Drawing Sheets

(56) References Cited

U.S. PATENT DOCUMENTS

2018/0239823 A1* 8/2018 Singh .................... G06Q 50/01

* cited by examiner

| Level 1<br>400A | Level 2<br>400B | Level 3<br>400C | ⋯ | Level N<br>400N |
|---|---|---|---|---|
| Education<br>402 | K-12 | ⋯ | | ⋯ |
| | Junior High/High School | ⋯ | | ⋯ |
| | College | ⋯ | | ⋯ |
| | Graduate School | ⋯ | | ⋯ |
| Entertainment<br>404 | Music<br>410 | ⋯ | | ⋯ |
| | Movies<br>412 | Comedy<br>420 | | ⋯ |
| | | Drama<br>422 | | ⋯ |
| | | Documentary<br>424 | | ⋯ |
| | | Horror<br>426 | | ⋯ |
| | | ⋮ | | |
| | Television<br>414 | ⋯ | | ⋯ |
| | Games<br>416 | ⋯ | | ⋯ |
| Activities<br>406 | Sports/Recreation | ⋯ | | ⋯ |
| | Travel | ⋯ | | ⋯ |
| | Attractions/Tours | ⋯ | | ⋯ |

SELECTING CONTENT FOR PRESENTATION TO A USER OF A SOCIAL NETWORKING SYSTEM BASED ON A TOPIC ASSOCIATED WITH A GROUP OF WHICH THE USER IS A MEMBER

BACKGROUND

This disclosure relates generally to social networking systems, and more specifically to selecting content items for presentation to a member of a group maintained in a social networking system.

A social networking system allows its users to connect and communicate with other social networking system users. Users create profiles in the social networking system that are tied to their identities and include information about the users, such as interests and demographic information. The users may be individuals or entities such as corporations or charities. Because of the popularity of social networking systems and the significant amount of user-specific information maintained in social networking systems, a social networking system provides an ideal forum for allowing users to create and join various groups of users ("groups") in the social networking system who share common interests (e.g., recreational hobbies, educational backgrounds, political viewpoints, etc.). Groups maintained in a social networking system are associated with topics that are common to social networking system users who are members of the same group. For example, topics associated with groups may include interests, associations, affiliations, a common workplace, a favorite celebrity, a religious view, and/or any other characteristics common to a group of users.

Groups facilitate communication between social networking system users belonging to the same group. For example, members of a group may post content to the group, participate in group discussions, etc. When a member of a group posts or uploads content to the group, a social networking system may generate a content item describing the action. The social networking system may then select the content item for presentation to members of the group in a "group page" dedicated to the group. In addition to content items describing actions performed by members of a group, a social networking system also may select additional types of content items for presentation to members of the group. For example, if members of a group live in a particular geographic region and share a common interest in paleontology, the social networking system may select a sponsored content item for presentation to members of the group (e.g., an advertisement about a paleontology exhibit at a local museum).

Conventionally, social networking systems select content items for presentation to social networking system users based on targeting criteria associated with the content items that specify one or more attributes for social networking system users eligible to be presented with the content items. For example, targeting criteria are used to identify users associated with specific user profile information satisfying at least one of the targeting criteria. Attributes specified by targeting criteria usually are associated with social networking system users who are likely to have an interest in content items associated with the targeting criteria or who are likely to find such content items relevant. For example, content items associated with a particular restaurant may be associated with targeting criteria describing social networking system users who have expressed an interest in the restaurant (e.g., users who frequently check in to the restaurant, users who have expressed a preference for a page associated with the restaurant maintained in a social networking system, etc.).

By using targeting criteria to select content items for presentation to social networking system users who are likely to have affinities for such content items, social networking systems may encourage user engagement with the social networking systems, which may increase the number of opportunities the social networking systems have to generate revenue. For example, if a user scrolls through a content feed to view content that captures the user's interest, sponsored content items that are interspersed in the content feed also may be presented to the user. In this example, the social networking system may charge a social networking system user associated with a sponsored content item (e.g., an advertiser) for each presentation of the sponsored content item (i.e., each "impression") to an additional social networking system user, or for each interaction with the sponsored content item by an additional social networking system user.

However, targeting criteria may not help social networking systems identify content items that are likely to be relevant to a group when information describing a topic associated with the group is absent. For example, if an administrator of a group forgets or refuses to provide information describing one or more topics associated with the group, the social networking system may not be able to determine whether attributes specified by targeting criteria associated with a content item are satisfied by information maintained in the social networking system associated with the group. In this example, if a member of the group accesses a group page associated with the group with the intent to view content related to the group, the social networking system may select content items for presentation to the member based on attributes for the member that are unrelated to a topic associated with the group. Continuing with this example, since the content items selected by the social networking system are unrelated to a topic associated with the group, the member of the group may find the presentation of these content items in the group page to be distracting and/or disruptive. As a result, the member may decide to leave the group or otherwise reduce their interaction with the social networking system. Diminished user engagement with a social networking system may decrease potential revenue to the social networking system from the presentation of sponsored content items.

SUMMARY

A social networking system allows users of the social networking system to create and join various groups maintained in the social networking system, in which each group is associated with one or more interests shared by users who are members of the same group. For example, members of a group may be family members, teammates in a sports league, coworkers, or users who share a common hobby. Groups allow social networking system users to easily connect and share content with additional users who are members of the same group.

The social networking system may maintain various types of objects associated with each group. For example, the social networking system may maintain a group page or a group photo album, which may be used by members of a group to share content with each other. In this example, members of the group may access the group page to post content to the group, to view content posted by other members of the group, to participate in group chats, to upload photos to the group photo album, and to collaborate on documents shared by the group.

The social networking system also may store various types of information associated with each group. For example, the social networking system may store information that may be used to identify or describe each group, such as a title of the group, a group profile picture, a description of the group, privacy settings for the group, and a geographic location associated with the group. Furthermore, the social networking system may maintain information associated with social networking system users who are members of a group, such as user identifying information, contact information, profile information, information describing a user's role within the group (e.g., administrator or moderator), and actions performed by a user in the social networking system (e.g., joining other groups, commenting on content posted by another social networking system user, etc.).

Groups, content items, and other objects maintained in the social networking system may be associated with one or more topics of interest ("topics"). Topics may include subject matter such as holidays, events, sports, movies, celebrities, interests/hobbies, etc. For example, if members of a group are fans of a particular actor, the group may be associated with a topic corresponding to the name of the actor. In some embodiments, objects may be associated with multiple topics. For example, content items associated with electric cars may be associated with topics including sustainability and automobiles while a group for a non-profit animal rescue may be associated with topics including animal adoptions and volunteer work/community service. Additionally, topics associated with an object may have a hierarchical relationship such that a topic associated with the object may be a subtopic of another topic that is also associated with the object. For example, a group associated with the topic of music also may be associated with a topic corresponding to a music genre included within the topic of music, as well as an additional topic corresponding to a musician or a song included within the topic of the music genre.

The social networking system may organize various objects maintained in the social networking system based at least in part on one or more topics associated with each object and on a classification system maintained in the social networking system, such as a hierarchical classification system. A hierarchical classification system may include multiple levels, in which each level of the classification system may correspond to one or more topics that may be associated with an object. For example, a hierarchical classification system may include a first level that corresponds to the broadest topics that may be associated with an object (e.g., travel, entertainment, sports, education, occupations, etc.). Furthermore, each topic corresponding to a level of the classification system may have any number of increasingly specific topics at additional levels of the classification system. In the above example, the topic of sports corresponding to the first level of the classification system may have a set of more specific topics within the topic of sports (e.g., types of sports), such as football, basketball, soccer, etc. that correspond to a second level of the classification system. Continuing with the above example, each of the more specific topics may have even more specific topics that correspond to a third level of the classification system, etc.

The social networking system may determine one or more topics associated with an object maintained in the social networking system based on information maintained in the social networking system associated with the object. For example, the social networking system may retrieve information maintained in the social networking system associated with a group, such as a geographic location associated with the group, a title of the group, or content posted to the group, and determine one or more topics associated with the group based on keywords extracted from the information. As an additional example, the social networking system may access an advertising account maintained in the social networking system associated with a group and determine one or more topics associated with the group based on keywords extracted from information provided by an administrator of the group describing a target audience of social networking system users to whom the group will be promoted (e.g., information describing user interests or hobbies). In some embodiments, the social networking system may extract data from information describing actions performed by users of the social networking system associated with an object and use the extracted data to determine a topic associated with the object. For example, the social networking system may determine that a group is associated with the topic of online gaming if information describing actions performed by members of the group indicate that at least a threshold number or percentage of members of the group have expressed a preference for pages maintained in the social networking system associated with online gaming and have joined other online gaming groups.

In some embodiments, the social networking system also may determine one or more topics associated with an object based on a classification system. For example, if a group of social networking system users are marathon runners, the social networking system may extract various keywords included in tags added to the group, such as "marathon," and compare the keywords with one or more topics corresponding to each level of a hierarchical classification system to determine where the keywords fit into the hierarchical classification system. In this example, the social networking system may determine that the group is associated with the topic of marathon if the keyword "marathon" matches a topic corresponding to a level of the hierarchical classification system. Furthermore, in this example, the social networking system also may determine that the group is associated with the topics of sports/fitness and running if the topic of marathon is within the broader topics of sports/fitness and running that correspond to additional levels of the hierarchical classification system. The social networking system may then continue to compare each additional keyword extracted from the tags with topics corresponding to each level of the hierarchical classification system and determine whether the group is associated with additional topics based on the comparisons.

The social networking system also may determine one or more topics associated with a group based on a measure of similarity between the group and an additional object maintained in the social networking system. For example, in addition to extracting keywords included in information associated with a group to determine one or more topics associated with the group, the social networking system also may identify a set of groups having at least a threshold measure of similarity to the group and extract keywords included in information associated with the set of groups. In this example, the social networking system may determine one or more topics associated with the group based on where the keywords extracted from information associated with the group as well as the set of groups fit into a hierarchical classification system.

In some embodiments, the social networking system may determine a measure of similarity between the group and an additional object maintained in the social networking system. For example, the social networking system may determine a measure of similarity between a group and an additional group based on a number of members the groups have in common, such that the measure of similarity is proportional to the number of members the groups have in common. As an additional example, if at least a threshold percentage of members of a group have expressed an interest in a set of content items, the social networking system may determine a measure of similarity between the group and an additional group that is proportional to the percentage of members of the additional group who have expressed an interest in the same set of content items. In some embodiments, the social networking system may determine a measure of similarity between two dissimilar types of objects. For example, if members of a group have posted content to the group and to a page maintained in the social networking system, the social networking system may determine a measure of similarity between the group and the page that is proportional to the percentage of members of the group who have posted content to the page.

Upon receiving a request to present content to a viewing user of the social networking system who is a member of a group, the social networking system may identify a set of candidate content items that may be presented to the viewing user. In some embodiments, the social networking system may identify the set of candidate content items based on information maintained in the social networking system stored in association with a profile of the viewing user. For example, the social networking system may retrieve one or more attributes associated with the viewing user (e.g., interests, demographic information, actions performed by the viewing user in the social networking system, etc.) and identify a set of candidate content items associated with targeting criteria (e.g., a minimum age requirement) that are satisfied by one or more attributes associated with the viewing user.

In various embodiments, the social networking system also may identify the set of candidate content items based on a frequency cap that describes a maximum frequency with which a content item may be presented to the same social networking system user. For example, based on a frequency cap, the social networking system may identify a content item as a candidate content item for a viewing user if the viewing user has not yet been presented with the candidate content item, but may not identify the content item as a candidate content item for a different viewing user who has already been presented with the content item. In some embodiments, the social networking system may adjust the frequency cap based on a frequency with which the viewing user previously interacted with the social networking system. For example, if a first viewing user interacts more frequently with the social networking system than a second viewing user, the social networking system may apply a less restrictive frequency cap on content items that potentially may be presented to the first viewing user than on content items that potentially may be presented to the second viewing user.

The social networking system may compute a "similarity score" for each candidate content item based at least in part on a measure of similarity between one or more topics associated with the candidate content item and one or more topics associated with the group of which the viewing user is a member. For example, the social networking system computes a similarity score for a candidate content item based on the number of topics associated with the candidate content item that match topics associated with the group, in which the similarity score is proportional to the number of matching topics. In some embodiments, the social networking system may associate different weights with different topics when computing a similarity score for a candidate content item. For example, if a group is associated with a topic of music and a more specific topic of country music, since the topic of country music is more specific than the topic of music, the social networking system may associate a greater weight with the topic of country music than with the topic of music. In this example, the social networking system may compute a higher similarity score for a candidate content item that is only associated with the more specific topic of country music than for a candidate content item that is only associated with the topic of music based on the weights associated with the corresponding topics.

In some embodiments, the social networking system also may compute a similarity score associated with a candidate content item based on information maintained in the social networking system stored in association with a profile of the viewing user. For example, the social networking system may identify a set of topics associated with a group of which the viewing user is a member and retrieve information describing actions previously performed by the viewing user in the social networking system indicating an affinity of the viewing user for each of the topics (e.g., expressing a preference for a content item associated with the topic or joining an additional group associated with the topic). In this example, the social networking system may predict an affinity of the viewing user for each of the topics based on the actions previously performed by the viewing user. Continuing with this example, the social networking system may compute a similarity score associated with each candidate content item that is proportional to the measure of similarity between one or more topics associated with the candidate content item and each of the set of topics, in which certain topics associated with the candidate content item are weighted more heavily than others based on the viewing user's predicted affinity for the topics.

In some embodiments, the social networking system may compute a similarity score for a candidate content item using a machine-learning model. The social networking system may train the model to compute a similarity score for a candidate content item based on training data describing previous actions performed by members of one or more groups with content items associated with various topics. For example, the social networking system may retrieve information describing a frequency of actions performed by members of different groups with content items, in which both the groups and the content items are associated with various topics and the actions tend to indicate an affinity of the members for the content items (e.g., by expressing a preference for the content items, sharing the content items with additional social networking system users, etc.). In this example, the social networking system may train a machine-learning model to compute a similarity score for a content item based on correlations between the actions performed by the members of the groups and the topics associated with the groups and with the content items. Once the social networking system has trained the machine-learning model, the social networking system may use the model to compute a similarity score for a candidate content item based on one or more topics associated with the candidate content item and one or more topics associated with a group of which the viewing user is a member. For example, the social networking system may retrieve information describing one or more topics associated with a candidate content item and one or more topics associated with a group of which the viewing user is a member and use the machine-learning model to compute a similarity score for the candidate content item based on the retrieved information.

The social networking system may select one or more of the candidate content items for presentation to the viewing user based at least in part on the similarity score computed for each candidate content item. In some embodiments, the social networking system ranks the candidate content items based on their associated similarity scores and selects one or more of the candidate content items for presentation to the viewing user based on the ranking. For example, the social networking system may rank the candidate content items from highest to lowest, such that the candidate content item associated with the highest similarity score is associated with the highest rank, the candidate content item associated with the second highest similarity score is associated with the second highest rank, etc. In this example, the social networking system may select one or more of the highest ranked candidate content items for presentation to the viewing user.

The content item(s) selected for presentation to the viewing user may be included in a user interface (e.g., a content feed) generated by the social networking system that is presented in a display area of a client device associated with the viewing user. In embodiments in which the content item(s) are presented to the viewing user in a content feed, the content items may be arranged within the content feed based at least in part on the similarity score associated with each content item. For example, if the social networking system ranks the candidate content items based on their associated similarity scores, the content items selected for presentation to the viewing user may be arranged in the content feed based at least in part on the ranking, such that the highest ranked content item is presented in a most prominent position of the content feed, the second highest ranked content item is presented in a second most prominent position of the content feed, etc.

The content items may be presented in conjunction with various features that facilitate user interaction with the content items. For example, if the viewing user is viewing a feed of content items via a group page, the content feed may include a feature allowing the user to scroll vertically or horizontally to view additional content items included in the feed. As an additional example, the viewing user may express a preference for a content item, comment on the content item, or share the content item with additional users of the social networking system by interacting with a button or other interactive element presented in conjunction with the content item.

In some embodiments, different content item(s) may be presented to users of the social networking system who are members of the same group. For example, in embodiments in which the social networking system selects candidate content items or computes similarity scores associated with candidate content items based in part on information stored in association with a profile of a viewing user, different content items may be selected for presentation to different users of the social networking system who are members of the same group. As an additional example, in embodiments in which candidate content items may be identified based on frequency caps, the social networking system may select different content items for presentation to different users of the social networking system who are members of the same group based on the frequency with which the content items previously were presented to the users.

Alternatively, the social networking system may present the same content item(s) to users of the social networking system who are members of the same group. For example, in embodiments in which the social networking system generates a content feed and includes the content item(s) selected by the social networking system in the content feed, the social networking system may associate the content feed with the group. In this example, the same content feed is presented to all members of the group in response to receiving a request from each of the members to access a group page associated with the group.

BRIEF DESCRIPTION OF THE DRAWINGS

FIG. 4 is an example hierarchical classification system, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
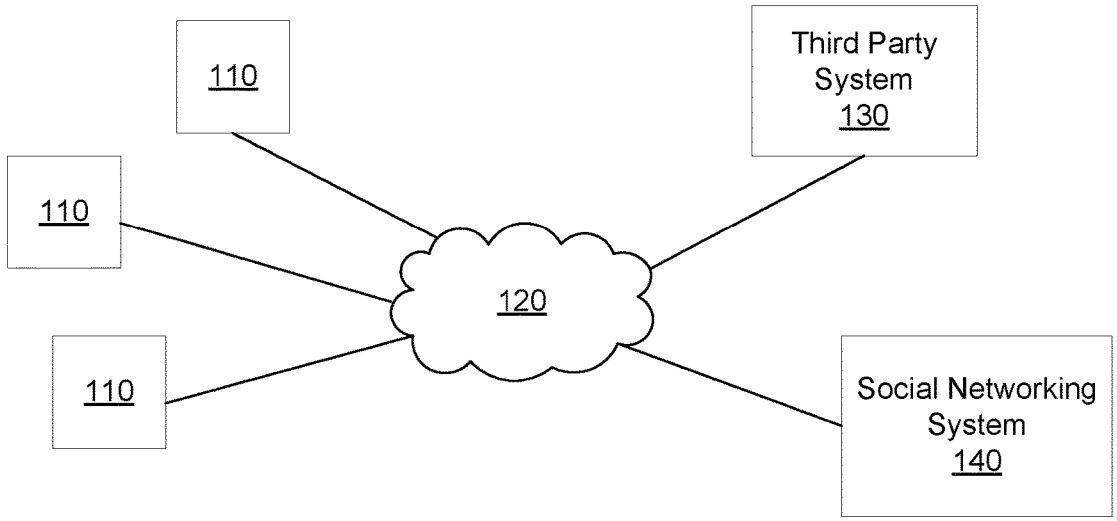
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third party systems 130, and the social networking system 140. In alternative configurations, different and/or additional components may be included in the system environment 100. The embodiments described herein may be adapted to online systems systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 also may communicate information to the social networking system 140, such as advertisements, content, or information about an application provided by the third party system 130.

Figure 2:
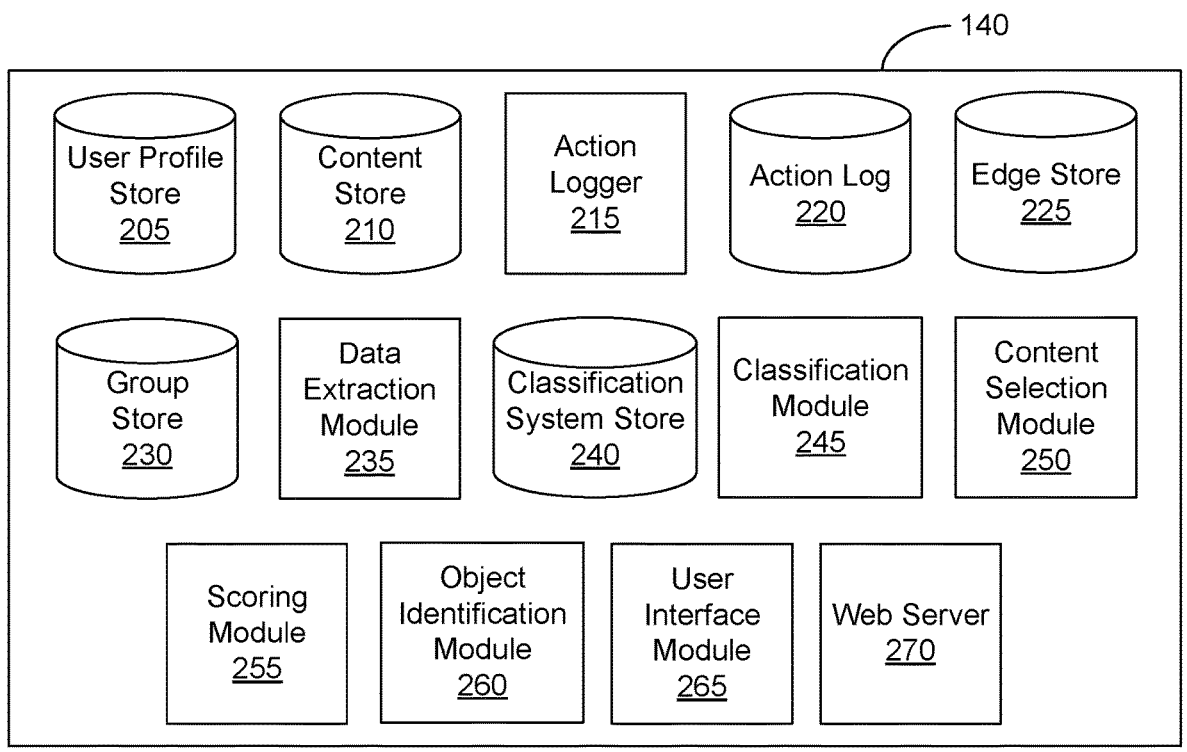
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a group store 230, a data extraction module 235, a classification system store 240, a classification module 245, a content selection module 250, a scoring module 255, an object identification module 260, a user interface module 265, and a web server 270. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and also may include profile information inferred by the social networking system 140. In one embodiment, a user profile includes multiple data fields, each describing one or more user attributes for the corresponding social networking system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the social networking system users displayed in an image. A user profile in the user profile store 205 also may maintain references to actions by the corresponding user performed on content items in the content store 210 and stored in the action log 220.

In some embodiments, information describing one or more groups associated with a user may be stored in association with a profile of the user in the user profile store 205. For example, a user profile describes a user as an administrator and creator of a group, privileges of the user with respect to the group, a date that the administrator created the group, etc. As an additional example, a user profile includes information that associates a corresponding user with multiple groups (e.g., the dates that the user joined various groups, left one or more groups, requested to become a member of a group, etc.).

While user profiles in the user profile store 205 are frequently associated with individuals, allowing individuals to interact with each other via the social networking system 140, user profiles also may be stored for entities such as businesses or organizations. This allows an entity to establish a presence in the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), an advertisement, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The content store 210 also may store (e.g., as shown in step 345 of FIG. 3) one or more topics that may be associated with various objects maintained in the social networking system 140. For example, the content store 210 may store one or more topics associated with a group, a page, or a content item maintained in the social networking system 140. Topics may include subject matter such as events (e.g., holidays or historic dates), people (e.g., celebrities or politicians), interests/hobbies (e.g., sports, movies, or music), etc. For example, if members of a group are fans of a particular athlete, the group and content posted to the group may be associated with a topic corresponding to the name of the athlete.

In some embodiments, objects may be associated with multiple topics. For example, content items associated with Italian cooking may be associated with the topics of Italy and food while a group for fans of a series of books may be associated with topics including the name of the series and the name of the author of the series. An object may be associated with a topic and one or more additional topics that are included within the topic (i.e., one or more subtopics). For example, a group for fans of a director of horror movies may be associated with the topic of movies, as well as a topic corresponding to a horror movie genre included within the topic of movies and an additional topic corresponding to the name of the director included within the topic of the horror movie genre. One or more topics associated with an object may be determined by the classification module 245 (described below) based on keywords extracted from information maintained in the social networking system 140 by the data extraction module 235 (also described below) and subsequently stored in the content store 210 in association with information identifying the object.

The action logger 215 receives (e.g., as shown in step 305 of FIG. 3) communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored (e.g., as shown in step 310 of FIG. 3) in the action log 220.

The action log 220 may be used by the social networking system 140 to track user actions in the social networking system 140, as well as actions in the third party system 130 that communicate information to the social networking system 140. Users may interact with various objects in the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects in the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the social networking system 140 as well as with other applications operating in the social networking system 140. In some embodiments, data from the action log 220 is used to infer interests or preferences of a user, augmenting the interests included in the user's user profile and allowing a more complete understanding of user preferences.

The action log 220 also may store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 for storing in the action log 220 by the application for recordation and association with the user by the social networking system 140.

In one embodiment, the edge store 225 stores information describing connections between users and other objects in the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page in the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

In some embodiments, information describing connections between groups and other objects maintained in the social networking system 140 (e.g., connections between users and content items posted to groups) may be stored in association with edges. Information stored in association with an edge may describe a relationship between a user and a group. For example, information stored in association with an edge may describe a membership status of a user in a group (e.g., pending or approved), a date the user became a member of the group or left the group, etc. Information stored in association with an edge also may describe actions performed by a user with a group and the date and time the actions were performed by the user. For example, information stored in association with an edge may describe content posted to the group by a user (e.g., photos posted to a group photo album associated with the group, messages posted to a group chatroom, etc.) and a timestamp associated with each post.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate a user's interest in an object, a topic, or another user in the social networking system 140 based on actions performed by the user. Computation of affinity is further described in U.S. patent application Ser. No. 12/978,265, filed on Dec. 23, 2010 (U.S. Publication No. US 2012/0166532 A1, published on Jun. 28, 2012), U.S. patent application Ser. No. 13/690,254 (U.S. Pat. No. 9,070,141, issued on Jun. 30, 2015), filed on Nov. 30, 2012, U.S. patent application Ser. No. 13/689,969, filed on Nov. 30, 2012 (U.S. Pat. No. 9,317,812, issued on Apr. 19, 2016), and U.S. patent application Ser. No. 13/690,088, filed on Nov. 30, 2012 (U.S. Publication No. US 2014/0156360 A1, published on Jun. 5, 2014), each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The group store 230 stores or maintains information associated with various groups maintained in the social networking system 140. Information associated with a particular group may be stored in the group store 230 in association with information identifying the group. Examples of such information may include a title of a group, a group profile photo or image, a description of the group (e.g., based on tags added to the group), privacy settings for the group (e.g., "open," "closed," or "secret"), a geographic location associated with the group, etc. In some embodiments, in addition to or as an alternative to storing one or more topics associated with a group in the content store 210, topic(s) associated with the group may be stored (e.g., as shown in step 345 of FIG. 3) in association with information identifying the group in the group store 230. As described above in conjunction with the content store 210, topics may include subject matter such as events (e.g., holidays or historic dates), people (e.g., celebrities or politicians), interests/hobbies (e.g., sports, movies, or music), etc.

Information associated with a group that may be stored in the group store 230 also may describe objects associated with the group. Examples of objects associated with a group may include a group page, a group photo album, a group content feed, a group calendar, files that may be viewed and edited by members of the group, a group event, and content posted by a member of the group. Examples of content that may be posted by a member of a group include photos posted to a group photo album, messages posted to a group message board, information describing events posted to a group calendar, content items posted to a group content feed, and any other types of content that may be posted to a page maintained in the social networking system 140 that is associated with the group, such as videos, images, text, etc.

Information associated with a group that is stored in the group store 230 may be specific to individual users associated with a group and their relationship to the group. For example, information stored in the group store 230 that is specific to a user associated with a group may include information identifying the user, contact information for the user and actions performed by the user in the social networking system 140 (e.g., joining other groups, commenting on content posted by another social networking system user, etc.). As an additional example, information stored in the group store 230 may include information that is specific to an individual user's relationship to a group, such as a membership status of the user with respect to a group (e.g., former member or current member), a role of the user within the group (e.g., administrator or moderator), and one or more privileges of the user with respect to the group (e.g., whether the user may remove content posted to a group page by other users). The group store 230 is further described below in conjunction with FIG. 3).

The data extraction module 235 extracts (e.g., as shown in step 325 of FIG. 3) data associated with an object maintained in the social networking system 140. The data extraction module 235 may extract various types of data associated with a group, such as a geographic location associated with the group or keywords associated with the group. Keywords associated with a group may be extracted from a title of a group, from content posted to the group, from tags added to the group, or from any other suitable information associated with the group. For example, the data extraction module 235 may extract various keywords from tags stored in the content store 210 and/or in the group store 230 that were previously provided by an administrator of a group to help prospective members of the group understand its purpose and to find the group in the social networking system 140. In this example, if the group is for social networking system users who play in a softball league, keywords extracted by the data extraction module 235 may include "softball" and "league."

The data extraction module 235 also may extract various types of data associated with a content item, such as keywords from tags added to images or videos included in the content item or keywords from text included in the content item. For example, if a content item featuring a car includes tags added to a video included in the content item, the data extraction module 235 may extract keywords from the content store 210 describing the car (e.g., the make and model of the car, the year of the car, etc.). As an additional example, the data extraction module 235 may access an advertising account maintained in the social networking system 140 associated with an advertisement and extract keywords from information provided by an advertiser describing a target audience of social networking system users to whom the advertisement will be promoted (e.g., information describing user interests or hobbies).

The data extraction module 235 also may extract information associated with users of the social networking system 140 who are associated with an object. For example, the data extraction module 235 may extract keywords included in demographic information and information describing interests associated with members of a group (e.g., from the user profile store 205 and/or from the group store 230). In some embodiments, the data extraction module 235 may extract information describing actions performed by users of the social networking system 140 who are associated with an object. For example, if at least a threshold number or percentage of members of a group have expressed a preference for pages maintained in the social networking system 140 associated with baking or have joined other baking groups, the data extraction module 235 may extract the keyword "baking" from data associated with the group (e.g., from the action log 220 and/or from the edge store 225). The functionality of the data extraction module 235 is further described below in conjunction with FIG. 3.

The classification system store 240 stores or maintains one or more classification systems used to organize objects maintained in the social networking system 140 based on topics associated with the objects. In some embodiments, a classification system maintained in the classification system store 240 is a hierarchical classification system. A hierarchical classification system may include multiple levels that each correspond to one or more topics that may be associated with an object maintained in the social networking system 140. For example, if a content item is associated with horses, a level of a hierarchical classification system may correspond to topics that may be associated with the content item, such as types of animals and/or horse breeds.

The levels of a hierarchical classification system may be arranged in order of increasing specificity, such that each topic corresponding to a level may have a set of more specific topics within the topic that correspond to an additional level of the hierarchical classification system. For example, the hierarchical classification system may include a first level that corresponds to the broadest topics that may be associated with an object (e.g., travel, entertainment, food, etc.). In this example, the topic of travel corresponding to this first level may have a set of more specific topics within the topic of travel (e.g., types of travel) that correspond to a second level of the hierarchical classification system. Furthermore, each topic corresponding to a level of the hierarchical classification system may have any number of increasingly specific topics at additional levels of the hierarchical classification system. In the above example, the topic of travel corresponding to the first level of the hierarchical classification system may have more specific topics of tours, business trips, visiting friends/relatives, etc. that correspond to the second level of the hierarchical classification system. Each of the more specific topics (e.g., tours) may have even more specific topics (e.g., cruise tours, hiking tours, bus tours, walking tours, Segway tours, etc.) that correspond to a third level of the hierarchical classification system, etc. The classification system store 240 is further described below in conjunction with FIGS. 3 and 4.

The classification module 245 determines (e.g., as shown in step 340 of FIG. 3) one or more topics associated with an object maintained in the social networking system 140. The classification module 245 may determine one or more topics associated with an object based at least in part on a classification system and on information maintained in the social networking system 140 associated with the object. In some embodiments, the classification module 245 may determine a topic associated with an object by comparing (e.g., as shown in step 335 of FIG. 3) data associated with the object (e.g., keywords extracted by the data extraction module 235) with one or more topics included in a classification system. For example, the classification module 245 may compare a keyword (e.g., "skiing") associated with a group with topics corresponding to different levels of a hierarchical classification system. The classification module 245 may then determine that the group is associated with the topic of skiing if the keyword "skiing" matches a topic corresponding to a level of the hierarchical classification system. In the above example, the classification module 245 also may determine that the group is associated with the topic of sports/fitness if the topic of skiing is within the broader topic of sports/fitness that corresponds to another level of the hierarchical classification system. Continuing with the above example, the classification module 245 may then compare any additional keywords associated with the group with the topics corresponding to each level of the hierarchical classification system and determine whether the group is associated with additional topics based on the comparisons.

In some embodiments, the classification module 245 may compare all or only a portion of a keyword associated with a group with all or only a portion of a topic corresponding to a level of a classification system. For example, if "bicycling" is a keyword associated with a group and "cycling" is a topic corresponding to a level of a classification system, the classification module 245 may truncate the keyword "bicycling" to "cycling" and then perform the comparison using the truncated keyword. In this example, the classification module 245 may determine that the group is associated with the topic of cycling since the truncated keyword matches this topic.

In various embodiments, the classification module 245 also may use synonyms for a keyword associated with a group and/or synonyms for a topic corresponding to a level of a classification system when comparing the keyword with the topic. For example, if "teacher" is a keyword associated with a group and "educator" is a topic corresponding to a level of a classification system, the classification module 245 may compare the keyword with the topic by determining whether "teacher" and "educator" are synonyms. In this example, since "teacher" and "educator" are synonyms, the classification module 245 may determine that the keyword matches the topic.

In some embodiments, the classification module 245 also may determine one or more topics associated with an object based in part on a measure of similarity between information maintained in the social networking system 140 associated with the object and information maintained in the social networking system 140 associated with an additional object. For example, to determine one or more topics associated with a group, the object identification module 260 (described below) may first identify a set of groups having at least a threshold measure of similarity to the group. In this example, the data extraction module 235 may then extract various keywords included in descriptions of both the group and the set of groups. Finally, the classification module 245 may determine one or more topics associated with the group based on where the keywords fit into a classification system. The functionality of the classification module 245 is further described below in conjunction with FIG. 3.

The content selection module 250 identifies (e.g., as shown in step 355 of FIG. 3) a set of candidate content items that may be presented to a viewing user of the social networking system 140 who is a member of a group. In some embodiments, the content selection module 250 may identify the set of candidate content items to present to the viewing user based on information maintained in the social networking system 140 stored in association with a profile of the viewing user (e.g., from the user profile store 205, from the action log 220, and/or from the edge store 225). For example, the content selection module 250 may retrieve one or more attributes associated with the viewing user (e.g., interests, demographic information, actions performed by the viewing user in the social networking system 140, etc.) and identify a set of candidate content items associated with targeting criteria (e.g., a minimum age requirement and a geographic location) that are satisfied by one or more attributes associated with the viewing user.

In various embodiments, the content selection module 250 also may identify a set of candidate content items based on a frequency cap. A frequency cap may describe a maximum frequency with which a content item may be presented to the same social networking system user. For example, based on a frequency cap, the content selection module 250 may identify a content item as a candidate content item for a viewing user if the viewing user has not yet been presented with the candidate content item, but may not identify the content item as a candidate content item for a different viewing user who has already been presented with the content item. In some embodiments, the content selection module 250 may adjust a frequency cap based on a frequency with which a viewing user previously interacted with the social networking system 140. For example, if a first viewing user interacts more frequently with the social networking system 140 than a second viewing user, the content selection module 250 may apply a less restrictive frequency cap on content items that potentially may be presented to the first viewing user than on content items that potentially may be presented to the second viewing user.

The content selection module 250 may select (e.g., as shown in step 370 of FIG. 3) one or more candidate content items for presentation to a viewing user of the social networking system 140. The content selection module 250 may select a candidate content item for presentation to the viewing user based at least in part on a similarity score (described below) computed for each candidate content item. In some embodiments, the content selection module 250 ranks (e.g., as shown in step 365 of FIG. 3) the candidate content items based on their associated similarity scores and selects one or more of the candidate content items for presentation to the viewing user based on the ranking. For example, the content selection module 250 may rank candidate content items from highest to lowest, such that the candidate content item associated with the highest similarity score is associated with the highest rank, the candidate content item associated with the second highest similarity score is associated with the second highest rank, etc. In this example, the content selection module 250 may select one or more of the highest ranked candidate content items for presentation to the viewing user. The functionality of the content selection module 250 is further described below in conjunction with FIGS. 3 and 5.

The scoring module 255 computes (e.g., as shown in step 360 of FIG. 3) a similarity score for objects maintained in the social networking system 140. In some embodiments, the scoring module 255 computes a similarity score for each candidate content item identified by the content selection module 250. The similarity score may be computed for a candidate content item based at least in part on a measure of similarity between one or more topics associated with the candidate content item and one or more topics associated with a group of which a viewing user is a member. For example, the scoring module 255 computes a similarity score for a candidate content item based on the number of topics associated with the candidate content item that match topics associated with a group of which the viewing user is a member, in which the similarity score is proportional to the number of matching topics.

In some embodiments, the scoring module 255 may associate different weights with different topics when computing a similarity score for a candidate content item. For example, if a group is associated with the topic of movies and the more specific topic of documentary movies, since the topic of documentary movies is more specific than the topic of movies, the scoring module 255 may associate a greater weight with the more specific topic of documentary movies than with the broader topic of movies. In this example, the scoring module 255 may compute a higher similarity score for a candidate content item that is only associated with the more specific topic of documentary movies than for a candidate content item that is only associated with the broader topic of movies based on the weights associated with the corresponding topics.

In some embodiments, the scoring module 255 also may compute a similarity score associated with a candidate content item based on information maintained in the social networking system 140 stored in association with a profile of a viewing user. For example, the scoring module 255 may identify a set of topics associated with a group of which the viewing user is a member (e.g., from the content store 210 and/or from the group store 230) and retrieve information describing actions previously performed by the viewing user in the social networking system 140 (e.g., from the action log 220 and/or from the edge store 225) indicating an affinity of the viewing user for each of the topics (e.g., sharing a content item associated with the topic, expressing a preference for a content item associated with the topic, joining an additional group associated with the topic, etc.). In this example, the scoring module 255 may predict an affinity of the viewing user for each of the topics based on the actions previously performed by the viewing user. Continuing with this example, the scoring module 255 may compute a similarity score associated with each candidate content item that is proportional to the measure of similarity between one or more topics associated with the candidate content item and each of the set of topics associated with the group, in which certain topics associated with the candidate content item are weighted more heavily than others based on the viewing user's predicted affinity for the topics.

In some embodiments, the scoring module 255 may compute a similarity score for each candidate content item using a machine-learning model. The scoring module 255 may train the model to compute a similarity score for a candidate content item based on training data describing previous actions performed by members of one or more groups with content items associated with various topics. For example, the scoring module 255 may retrieve information describing a frequency of actions performed by members of different groups with content items, in which both the groups and the content items are associated with various topics and the actions tend to indicate an affinity of the members for the content items (e.g., by expressing a preference for the content items, sharing the content items with additional social networking system users, etc.). In this example, the scoring module 255 may train a machine-learning model to compute a similarity score for a content item based on correlations between the actions performed by the members of the groups and the topics associated with the groups and with the content items. Once the scoring module 255 has trained the machine-learning model, the scoring module 255 may use the model to compute a similarity score for a candidate content item based on one or more topics associated with the candidate content item and one or more topics associated with a group of which the viewing user is a member. For example, the scoring module 255 may retrieve information describing one or more topics associated with a candidate content item and one or more topics associated with a group of which the viewing user is a member and use the machine-learning model to compute a similarity score for the candidate content item based on the retrieved information. The functionality of the scoring module 255 is further described below in conjunction with FIG. 3.

The object identification module 260 determines a measure of similarity between one or more objects maintained in the social networking system 140 and a group. In some embodiments, the object identification module 260 may determine a measure of similarity between two groups. For example, the object identification module 260 may determine a measure of similarity between a group and an additional group based on a number of members the groups have in common, such that the measure of similarity is proportional to the number of members the groups have in common. As an additional example, if at least a threshold percentage of members of a group have expressed an interest in a set of content items, the object identification module 260 may determine a measure of similarity between the group and an additional group that is proportional to the percentage of members of the additional group who have expressed an interest in the same set of content items.

In some embodiments, the object identification module 260 may determine a measure of similarity between two dissimilar types of objects. For example, if members of a group have posted content to the group and to a page maintained in the social networking system 140, the object identification module 260 may determine a measure of similarity between the group and the page that is proportional to the percentage of members of the group who have posted content to the page. As an additional example, to determine a measure of similarity between a group and a page, keywords may be extracted from content posted to the group and from content posted to the page (e.g., by the data extraction module 235). In this example, the object identification module 260 may then determine that the measure of similarity between the group and the page is proportional to the number of keywords that the group and the page have in common.

Once the object identification module 260 has determined a measure of similarity between one or more objects and a group, the object identification module 260 may identify (e.g., as shown in step 320 of FIG. 3) a set of those objects having at least a threshold measure of similarity to the group. For example, the set of objects identified by the object identification module 260 having at least a threshold measure of similarity to a group may include one or more pages and one or more additional groups maintained in the social networking system 140 having a measure of similarity to the group that is at least a threshold measure of similarity. The functionality of the object identification module 260 is further described below in conjunction with FIG. 3.

The user interface module 265 generates (e.g., as shown in step 375 of FIG. 3) a user interface that may be presented to a viewing user of the social networking system 140. The user interface module 265 may generate a user interface that includes one or more content items selected for presentation to a viewing user by the content selection module 250. The user interface may include contextual information associated with each content item, such as a profile picture of each member of the group who posted content included in the content item and an amount of time elapsed since the content was posted. In some embodiments, the user interface is a content feed that includes multiple content items. For example, the user interface module 265 may generate a scrollable content feed that includes one or more content items.

In some embodiments, content items selected for presentation to the viewing user are arranged within the user interface based at least in part on a ranking or on a similarity score associated with each content item. For example, if the content selection module 250 ranks candidate content items based on their associated similarity scores, the content items selected for presentation to the viewing user may be arranged in a content feed based at least in part on the ranking, such that the highest ranked content item is in a most prominent position of the content feed, the second highest ranked content item is in a second most prominent position of the content feed, etc.

The user interface may include various features that facilitate user interaction with the content items included in the user interface. For example, if the viewing user is viewing a feed of content items via a group page, the content feed may include a feature enabling the user to scroll vertically or horizontally to view additional content items included in the feed. As an additional example, the viewing user may express a preference for a content item, comment on the content item, or share the content item with additional users of the social networking system 140 by interacting with a button or other interactive element presented in conjunction with the content item. The functionality of the user interface module 265 is further described below in conjunction with FIGS. 3 and 5.

The web server 270 links the social networking system 140 via the network 120 to the one or more client devices 110, as well as to the third party system 130 and/or one or more third party systems. The web server 270 serves web pages, as well as other content, such as JAVA®, FLASH®, XML and so forth. The web server 270 may receive and route messages between the social networking system 140 and the client device 110, for example, instant messages, queued messages (e.g., email), text messages, short message service (SMS) messages, or messages sent using any other suitable messaging technique. A user may send a request to the web server 270 to upload information (e.g., images or videos) that are stored in the content store 210. Additionally, the web server 270 may provide application programming interface (API) functionality to send data directly to native client device operating systems, such as IOS®, ANDROID™, WEBOS® or BlackberryOS.

Figure 3:
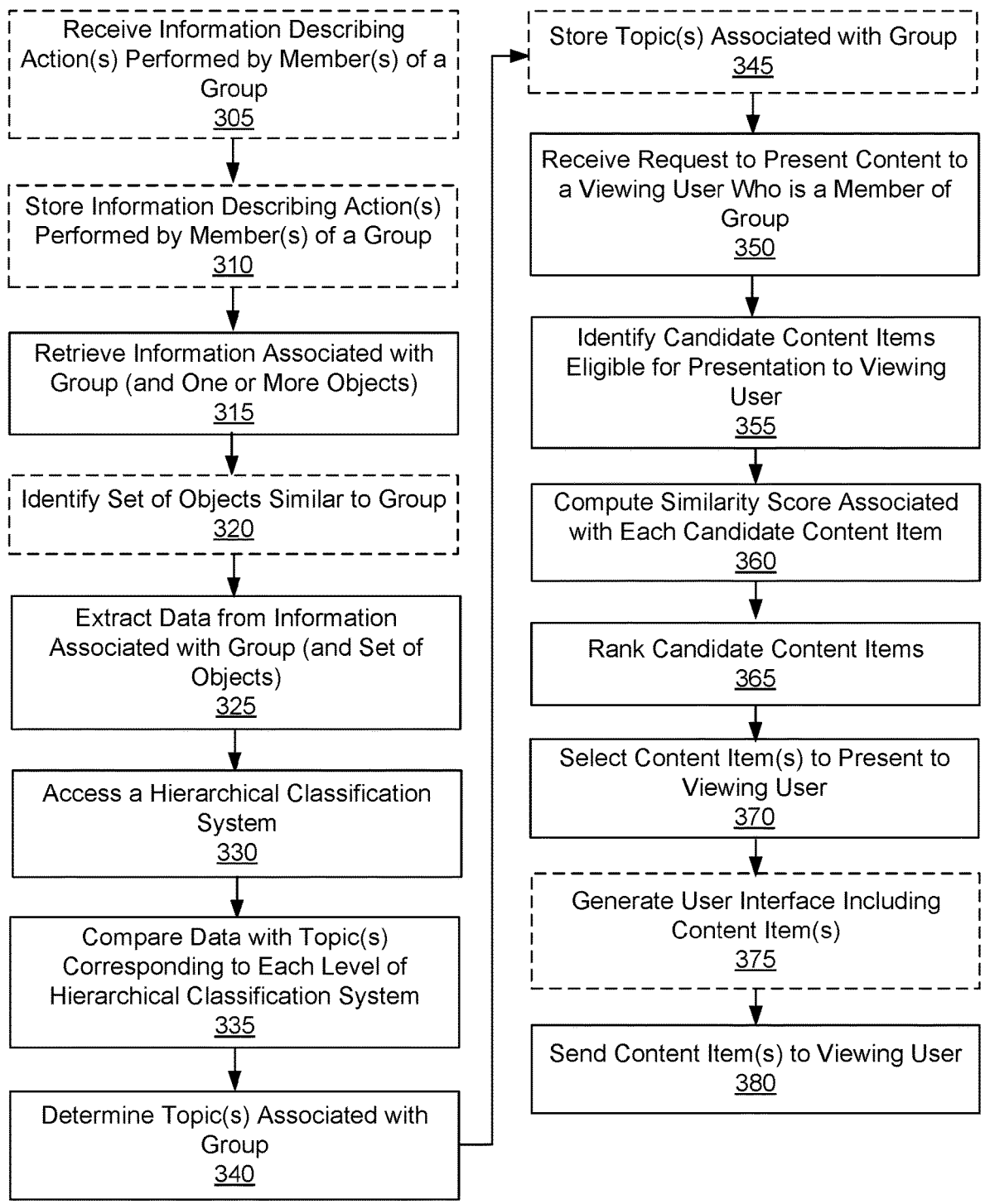
FIG. 3 is a flow chart of a method for selecting content for presentation to a viewing user of a social networking system based on a topic associated with a group of which the viewing user is a member, in accordance with an embodiment.

Selecting Content for Presentation to a Group Member in a Social Networking System FIG. 3 is a flow chart of a method for selecting content for presentation to a viewing user of a social networking system based on a topic associated with a group of which the viewing user is a member according to one embodiment. In other embodiments, the method may include different and/or additional steps than those shown in FIG. 3. Additionally, steps of the method may be performed in a different order than the order described in conjunction with FIG. 3.

In some embodiments, the social networking system 140 may receive 305 (e.g., via the action logger 215) information describing one or more actions performed by one or more members of a group. Examples of actions that may be performed by a member of a group include posting content to a group content feed associated with the group, commenting on content posted to the group by another member of the group, attending an event for the group, etc. For example, the social networking system 140 may receive 305 a request from a member of a group to post a photo to a group photo album associated with the group. In this example, various types of information may be included in the request, such as a time that the request was received, as well as information identifying the group member from whom the request was received (e.g., based on a username or user ID associated with the member), a title and format of the photo (e.g., JPEG, PNG, etc.), a name of the group photo album, and a name or other identifier associated with the group.

The social networking system 140 may store 310 (e.g., via the action logger 215) the information describing action(s) performed by member(s) of the group. The social networking system 140 may store 310 the information describing an action performed by a member of the group in association with information identifying the group in the group store 230, in association with information identifying the user in the user profile store 205, in association with an edge in the edge store 225, in association with information identifying a content item with which the user performed the action in the content store 210, and/or in association with information identifying the user and the action the action log 220. For example, information stored 310 in association with an edge in the edge store 225 may describe content posted to the group by the user (e.g., photos posted to a group photo album associated with the group, messages posted to a group chatroom, etc.) and a timestamp associated with each post.

The social networking system 140 retrieves 315 information associated with the group (e.g., from the content store 210 or from the group store 230). In some embodiments, the information retrieved 315 by the social networking system 140 associated with the group may identify or describe the group. For example, information associated with the group may include a title of the group, a group profile photo or image, a description of the group (e.g., based on tags added to the group), privacy settings for the group (e.g., "open," "closed," or "secret"), a geographic location associated with the group, etc. Information associated with the group also may describe objects associated with the group. For example, objects associated with the group may include a group page, a group photo album, a group content feed, a group calendar, files that may be viewed and edited by members of the group, a group event, etc. In some embodiments, information associated with the group also may describe content posted by a member of the group (e.g., to a group page). For example, content posted by a group member may include photos posted to a group photo album, messages posted to a group message board, information describing events posted to a group calendar, content items posted to a group content feed, or any other types of content (e.g., videos, images, text, etc.) that may be posted by group members to a page maintained in the social networking system 140 that is associated with the group.

In various embodiments, the social networking system 140 retrieves 315 information that may be specific to individual users associated with the group (e.g., from the user profile store 205 or the action log 220). For example, information specific to a user associated with the group may include information identifying the user (e.g., a username or a user ID), contact information for the user (e.g., an email address or a phone number), actions performed by the user in the social networking system 140 (e.g., joining other groups, expressing a preference for content posted by another social networking system user, etc.), profile information associated with the user (e.g., interests or demographic information), etc. Information associated with the group also may be specific to relationships individual users may have with the group. For example, information specific to a user associated with the group may include information describing a membership status of the user with respect to a group (e.g., former member, current member, a user whose membership in the group is pending approval, etc.), a role of the user within the group (e.g., administrator or moderator), and one or more privileges of the user with respect to the group (e.g., to approve or deny membership requests).

In some embodiments, the social networking system 140 also may retrieve 315 information associated with one or more additional objects maintained in the social networking system 140. For example, the social networking system 140 also may retrieve 315 information associated with one or more pages maintained in the social networking system 140 (e.g., from the content store 210). In this example, information associated with each of the pages may include information describing content posted to the page, tags associated with the page, or any other types of information that may be associated with the page. As an additional example, the social networking system 140 also may retrieve 315 information associated with additional groups maintained in the social networking system 140 (e.g., from the group store 230). In this example, information describing each of the additional groups may include information identifying members of each of the additional groups, information describing a title of each of the additional groups, etc.

In some embodiments, the social networking system 140 may identify 320 (e.g., using the object identification module 260) a set of objects having at least a threshold measure of similarity to the group. In some embodiments, the social networking system 140 may identify 320 the set of objects having at least a threshold measure of similarity to the group by first determining (e.g., using the object identification module 260) a measure of similarity between one or more objects and the group. For example, the social networking system 140 may determine a measure of similarity between the group and an additional group based on a number of members the groups have in common, such that the measure of similarity is proportional to the number of members the groups have in common. As an additional example, if at least a threshold percentage of members of the group have expressed an interest in a set of content items, the social networking system 140 may determine a measure of similarity between the group and an additional group that is proportional to the percentage of members of the additional group who have expressed an interest in the same set of content items.

In some embodiments, the social networking system 140 may determine a measure of similarity between two dissimilar types of objects. For example, if members of the group have posted content to the group and to a page maintained in the social networking system 140, the social networking system 140 may determine a measure of similarity between the group and the page that is proportional to the percentage of members of the group who have posted content to the page. As an additional example, to determine a measure of similarity between a group and a page, keywords may be extracted from content posted to the group and from content posted to the page (e.g., by the data extraction module 235). In this example, the social networking system 140 may then determine that the measure of similarity between the group and the page is proportional to the number of keywords that the group and the page have in common.

Once the social networking system 140 has determined a measure of similarity between one or more objects and the group, the social networking system 140 may identify 320 a set of those objects having at least a threshold measure of similarity to the group. For example, the set of objects identified by the social networking system 140 having at least a threshold measure of similarity to the group may include one or more pages and one or more additional groups maintained in the social networking system 140 having a measure of similarity to the group that is at least a threshold measure of similarity.

The social networking system 140 extracts 325 (e.g., using the data extraction module 235) a set of data associated with the group from the information maintained in the social networking system 140. Data associated with the group may include a geographic location associated with the group or keywords included in a title of the group, in content posted to the group, or in tags added to the group, etc. For example, if a group of social networking system users play in a basketball league, an administrator of the group may add tags to the group that describe the group to help prospective members of the group understand its purpose and to find the group in the social networking system 140. In this example, the social networking system 140 may extract 325 various keywords included in the tags, such as "basketball" and "league." As an additional example, the social networking system 140 may access an advertising account maintained in the social networking system 140 associated with a group of social networking system users who enjoy mountain climbing and extract 325 keywords from information provided by an administrator of the group describing a target audience of social networking system users to whom the group will be promoted. In this example, the keywords (e.g., "outdoors," "mountaineering," and "climbing") may describe social networking system users having particular interests or hobbies who will likely have an interest in the group.

In some embodiments, the set of data associated with the group extracted 325 by the social networking system 140 may include data associated with content items associated with the group (e.g., content items posted to a content feed associated with the group or with which members of the group interacted). Data extracted 325 from content items associated with the group may include keywords extracted 325 from tags added to images or videos included in a content item or keywords extracted 325 from text included in the content item. For example, if an advertisement for a mobile device includes tags added to a video included in the advertisement, keywords extracted 320 from the tags may describe the manufacturer of the mobile device, the name or model number of the mobile device, and the type of mobile device (e.g., smartphone, tablet, etc.).

In various embodiments, the social networking system 140 may extract 325 information associated with users of the social networking system 140 who are associated with the group, such as demographic information associated with members of the group and information describing actions performed by members of the group. For example, the social networking system 140 may extract 325 keywords included in demographic information and information describing hobbies and occupations associated with members of a group (e.g., from the user profile store 205). As an additional example, if at least a threshold number or percentage of members of a group have expressed a preference for content items maintained in the social networking system 140 associated with cheerleading or have joined other cheerleading groups, the social networking system 140 may extract 325 the keyword "cheerleading" from data associated with the group (e.g., from the action log 220 and/or from the edge store 225).

In embodiments in which the social networking system 140 identifies 320 a set of objects having at least a threshold measure of similarity to the group, the social networking system 140 also may extract 325 data from information associated with these objects and/or social networking system users associated with these objects. For example, the social networking system 140 may extract 325 various keywords included in content posted to a page maintained in the social networking system 140 if the page has at least a threshold measure of similarity to the group. As an additional example, if the group has at least a threshold measure of similarity to an additional group, the social networking system 140 may extract 325 one or more keywords from data included in a profile of a social networking system user 140 who is a member of the additional group (e.g., from the user profile store 205).

Once the social networking system 140 has extracted 325 a set of data associated with the group, the social networking system 140 may access 330 a hierarchical classification system (e.g., maintained in the classification system store 240). The hierarchical classification system may include multiple levels arranged in order of increasing specificity based at least in part on a set of topics corresponding to each level. Each topic corresponding to a level of the hierarchical classification system may be associated with an object maintained in the social networking system 140. For example, if a content item is associated with computers, a level of the hierarchical classification system may correspond to topics that may be associated with the content item, such as types of electronic devices and/or types of computers.

The levels of a hierarchical classification system may be arranged in order of increasing specificity, such that each topic corresponding to a level may have a set of more specific topics within the topic that correspond to a different level of the hierarchical classification system. For example, the hierarchical classification system may include a first level that corresponds to the broadest topics that may be associated with an object (e.g., travel, entertainment, food, etc.). In this example, the topic of food corresponding to this first level may have a set of more specific topics within the topic of food (e.g., types of cuisines) that correspond to a second level of the hierarchical classification system. Furthermore, each topic corresponding to a level of the hierarchical classification system may have any number of increasingly specific topics at additional levels of the hierarchical classification system. In the above example, the topic of food corresponding to the first level of the hierarchical classification system may have more specific topics of Chinese food, Japanese food, Mediterranean food, etc. that correspond to the second level of the hierarchical classification system. Each of the more specific topics (e.g., Chinese food) may have even more specific topics (e.g., noodle dishes, rice dishes, soups, etc.) that correspond to a third level of the hierarchical classification system, etc.

As shown in the example of FIG. 4, the hierarchical classification system may have any number of levels 400A-N. Level 1 400A of the hierarchical classification system corresponds to the broadest topics that may be associated with an object, such as education 402, entertainment 404, activities 406, etc. Level 2 400B of the hierarchical classification system corresponds to more specific topics within the topics corresponding to Level 1 400A. For example, the topics corresponding to Level 2 400B within the topic of entertainment 404 include the subtopics of music 410, movies 412, television 414, and games 416. Level 3 400C of the hierarchical classification system corresponds to even more specific topics within the topics corresponding to Level 2 400B. For example, the topics corresponding to Level 3 400C within the topic of movies 412 include the subtopics of comedy 420, drama 422, documentary 424, horror 426, etc.

Referring back to FIG. 3, the social networking system 140 may compare 335 (e.g., using the classification module 245) the data associated with the group (and the set of objects) with one or more topics corresponding to each of the levels of the hierarchical classification system. In some embodiments, the social networking system 140 may compare 335 one or more keywords extracted 325 from the information maintained in the social networking system 140 associated with the group with the topics corresponding to the levels of the hierarchical classification system. For example, the social networking system 140 may compare 335 a keyword (e.g., "hiking") associated with a group with topics corresponding to different levels of the hierarchical classification system.

In some embodiments, the social networking system 140 may compare 335 all or only a portion of a keyword associated with a group with all or only a portion of a topic corresponding to a level of the hierarchical classification system. For example, if "runners" is a keyword associated with a group and "running" is a topic corresponding to a level of the hierarchical classification system, the social networking system 140 may truncate both the keyword "runners" and the topic "running" to "run." In this example, the social networking system 140 may then perform the comparison using the truncated keyword and topic.

In various embodiments, the social networking system 140 also may use synonyms for a keyword associated with a group and/or synonyms for a topic corresponding to a level of the hierarchical classification system when comparing 335 the keyword with the topic. For example, if "doctor" is a keyword associated with a group and "physician" is a topic corresponding to a level of the hierarchical classification system, the social networking system 140 may compare 335 the keyword with the topic by determining whether "doctor" and "physician" are synonyms.

Based at least in part on the comparison, the social networking system 140 may determine 340 (e.g., using the classification module 245) one or more topics associated with the group. For example, the social networking system 140 may determine 340 that the group is associated with the topic of hiking if the keyword "hiking" matches a topic corresponding to a level of the hierarchical classification system. In this example, the social networking system 140 also may determine 340 that the group is associated with the topic of sports/fitness if the level of the hierarchical classification system corresponding to the topic of hiking is within the more general topic of sports/fitness that corresponds to an additional level of the hierarchical classification system.

In embodiments in which the social networking system 140 compares 335 only a portion of a keyword associated with a group and/or only a portion of a topic corresponding to a level of the hierarchical classification system, the social networking system 140 may determine 340 whether the group is associated with the topic if some or all of the keyword matches some or all of the topic. For example, if "golfers" is a keyword associated with a group and "golfing" is a topic corresponding to a level of the hierarchical classification system, the social networking system 140 may truncate both the keyword "golfers" and the topic "golfing" to "golf." In this example, since the truncated keyword and topic match, the social networking system 140 may determine 340 that the group is associated with the topic of golfing.

In embodiments in which the social networking system 140 uses synonyms for a keyword associated with a group and/or synonyms for a topic corresponding to a level of the hierarchical classification system when comparing 335 the keyword with the topic, the social networking system 140 may determine 340 that the group is associated with the topic if it determines that the keyword and the topic are synonyms. For example, if "lawyer" is a keyword associated with a group and "attorney" is a topic corresponding to a level of the hierarchical classification system, the social networking system 140 may determine 340 that the group is associated with the topic of "attorney" since "lawyer" and "attorney" are synonyms.

In some embodiments, upon determining 340 one or more topics associated with the group, the social networking system 140 may store 345 the topic in association with information identifying the group. For example, the social networking system 140 may store 345 a topic associated with the group in association with a name or other identifier associated with the group in the group store 230. In the above example, the social networking system 140 alternatively or also may store 345 the topic associated with the group in association with information identifying the group in the content store 210.

The social networking system 140 receives 350 a request to present content to a viewing user of the social networking system 140 who is a member of the group. In some embodiments, the social networking system 140 receives 350 the request to present content to the viewing user when the viewing user submits a request to the social networking system 140 to access a group page associated with the group. For example, the social networking system 140 receives 350 a request to present a feed of content items to the viewing user via a group page associated with a group of which the viewing user is a member.

The social networking system 140 identifies 355 (e.g., using the content selection module 250) a set of candidate content items eligible for presentation to the viewing user. In some embodiments, the social networking system 140 may identify 355 the set of candidate content items based on information maintained in the social networking system 140 stored in association with a profile of the viewing user. For example, the social networking system 140 may retrieve one or more attributes associated with the viewing user, such as interests and demographic information from the user profile store 205 and actions performed by the viewing user in the social networking system 140 from the action log 220 or the edge store 225. In this example, the social networking system 140 may identify 355 a set of candidate content items associated with targeting criteria (e.g., a minimum age requirement and a geographic location) that are satisfied by one or more attributes associated with the viewing user.

In various embodiments, the social networking system 140 also may identify 355 the set of candidate content items based on a frequency cap. A frequency cap may describe a maximum frequency with which a content item may be presented to the same viewing user. For example, based on a frequency cap, the social networking system 140 may identify 355 a content item as a candidate content item for a viewing user who is a member of a group if the viewing user has not yet been presented with the candidate content item. In this example, based on the same frequency cap, the social networking system 140 may not identify 355 the content item as a candidate content item for a different viewing user who also is a member of the group, but who has already been presented with the content item. In some embodiments, the social networking system 140 may adjust the frequency cap based on a frequency with which the viewing user previously interacted with the social networking system 140. For example, the social networking system 140 may apply a more restrictive frequency cap on content items that potentially may be presented to a viewing user whose frequency of interactions with the social networking system 140 is less than a threshold frequency while applying a less restrictive frequency cap on content items that potentially may be presented to a viewing user whose frequency of interactions with the social networking system 140 is at least the threshold frequency.

A similarity score for each of the candidate content items may be computed 360 (e.g., using the scoring module 255) by the social networking system 140. The social networking system 140 may compute 360 a similarity score for a candidate content item based at least in part on a measure of similarity between one or more topics associated with the candidate content item and one or more topics associated with the group. For example, the social networking system 140 computes 360 a similarity score for a candidate content item based on the number of topics associated with the candidate content item that match topics associated with the group, in which the similarity score is proportional to the number of matching topics.

In some embodiments, the social networking system 140 may associate different weights with different topics when computing 360 a similarity score for a candidate content item. For example, if a group is associated with the topic of movies and the more specific topic of comedies, since the topic of comedies is more specific than the topic of movies, the social networking system 140 may associate a greater weight with the topic of comedies than with the topic of movies. In this example, the social networking system 140 may compute 360 a higher similarity score for a candidate content item that is only associated with the more specific topic of comedies than for a candidate content item that is only associated with the topic of movies based on the weights associated with the topics.

In some embodiments, the social networking system 140 also may compute 360 a similarity score associated with a candidate content item based on information maintained in the social networking system 140 stored in association with a profile of the viewing user. For example, the social networking system 140 may identify a set of topics associated with a group of which the viewing user is a member and retrieve information from the action log 220 describing actions previously performed by the viewing user in the social networking system 140 indicating an affinity of the viewing user for each of the topics (e.g., by expressing a preference for a content item associated with the topic or by joining an additional group associated with the topic). In this example, the social networking system 140 may predict an affinity of the viewing user for each of the topics based on the actions previously performed by the viewing user. Continuing with this example, the social networking system 140 may compute 360 a similarity score associated with each candidate content item that is proportional to the measure of similarity between one or more topics associated with the candidate content item and each of the set of topics associated with the group, in which certain topics are weighted more heavily than others based on the viewing user's predicted affinity for the topics.

In some embodiments, the social networking system 140 may compute 360 a similarity score for each candidate content item using a machine-learning model. The social networking system 140 may train the model to compute 360 a similarity score for a candidate content item based on training data describing previous actions performed by members of one or more groups with content items associated with various topics. For example, the social networking system 140 may retrieve information describing a frequency of actions performed by members of different groups with content items, in which both the groups and the content items are associated with various topics and the actions tend to indicate an affinity of the members for the content items (e.g., by expressing a preference for the content items, sharing the content items with additional social networking system users, etc.). In this example, the social networking system 140 may train a machine-learning model to compute 360 a similarity score for a content item based on correlations between the actions performed by the members of the groups and the topics associated with the groups and with the content items. Once the social networking system 140 has trained the machine-learning model, the social networking system 140 may use the model to compute 360 a similarity score for a candidate content item based on one or more topics associated with the candidate content item and one or more topics associated with a group of which the viewing user is a member. For example, the social networking system 140 may retrieve information describing one or more topics associated with a candidate content item and one or more topics associated with a group of which the viewing user is a member and use the machine-learning model to compute 360 a similarity score for the candidate content item based on the retrieved information.

In some embodiments, the social networking system 140 ranks 365 (e.g., using the content selection module 250) the set of candidate content items based at least in part on the similarity score computed 360 for each of the set of candidate content items. For example, the social networking system 140 may rank 365 the candidate content items from highest to lowest, such that the candidate content item associated with the highest similarity score is associated with the highest rank, the candidate content item associated with the second highest similarity score is associated with the second highest rank, etc. Based at least in part on the ranking, the social networking system 140 may select 370 (e.g., using the content selection module 250) one or more content items from the set of candidate content items. In the above example, the social networking system 140 may select 370 one or more of the highest ranked candidate content items for presentation to the viewing user.

The social networking system 140 may generate 375 (e.g., using the user interface module 265) a user interface that includes the candidate content items selected 370 for presentation to the viewing user. The social networking system 140 may generate 375 the user interface upon selecting 370 content item(s) to be presented to the viewing user. For example, once the social networking system 140 has selected 370 one or more candidate content items for presentation to the viewing user, the social networking system 140 may generate 375 a content feed that includes the content items.

Figure 5:
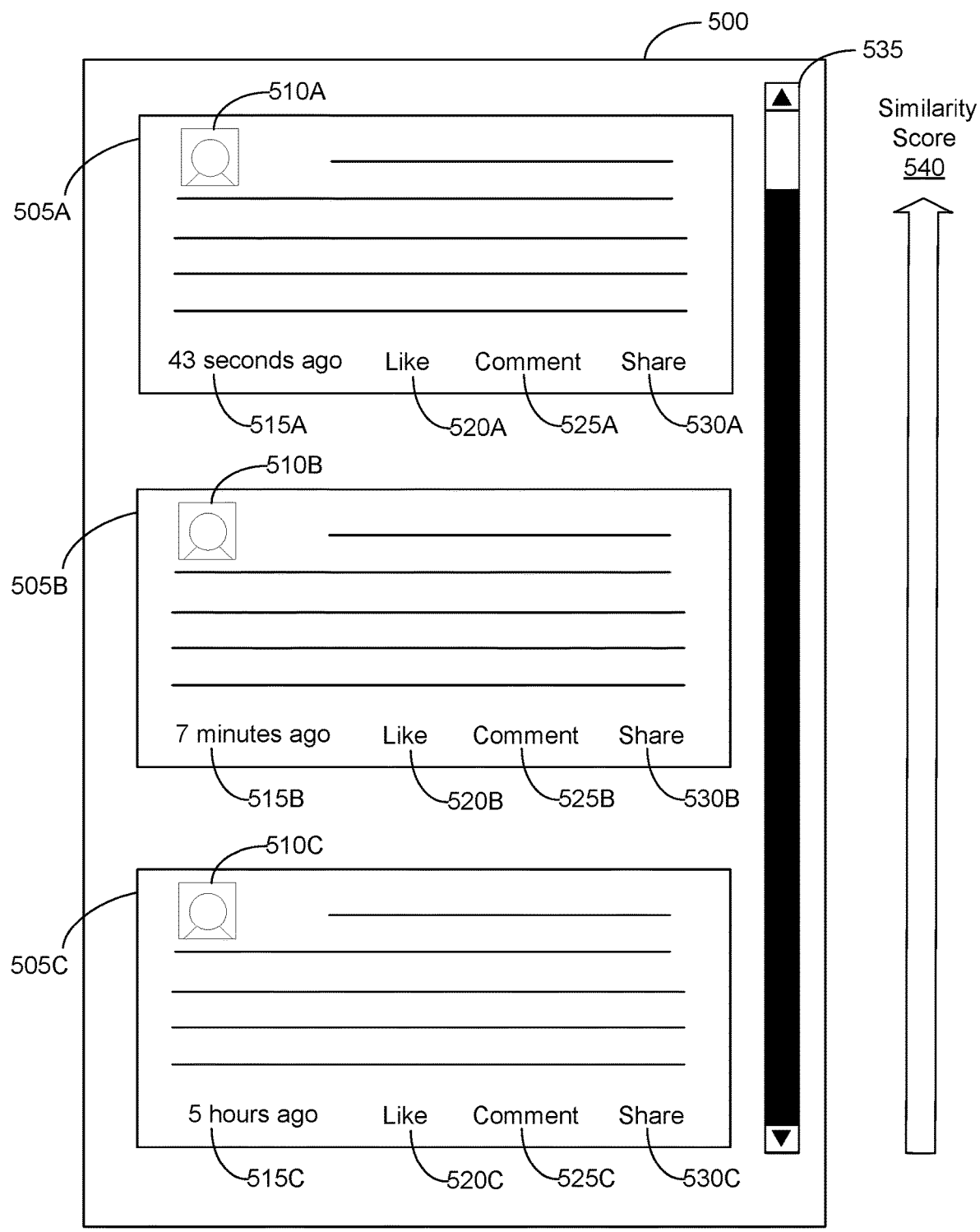
FIG. 5 is an example user interface including content selected for presentation to a viewing user of a social networking system based on a topic associated with a group of which the viewing user is a member, in accordance with an embodiment.

In some embodiments, content items selected 370 for presentation to the viewing user are arranged within the user interface based at least in part on a ranking or a similarity score associated with each content item. For example, as shown in FIG. 5, if the social networking system 140 ranks 365 candidate content items 505 based on their associated similarity scores 540, the content items 505 selected 370 for presentation to a viewing user may be arranged in a content feed 500 based at least in part on the ranking, such that the highest ranked content item 505A (i.e., the content item 505 associated with the highest similarity score 540) is in a most prominent position of the content feed 500, the second highest ranked content item 505B is in a second most prominent position of the content feed 500, etc.

The user interface may include various features that facilitate user interaction with the content items included in the user interface. Referring again to FIG. 5, if the viewing user is viewing a content feed 500 via a group page, the content feed 500 may include contextual information associated with each content item 505, such as a profile picture 510 of each member of the group who posted content included in the content item 505 and an amount of time elapsed 515 since the content was posted. Additionally, the content feed 500 may include a feature enabling the user to scroll 535 to view additional content items included in the content feed 500. Furthermore, the viewing user may interact with a button or other interactive element presented in conjunction with the content items 505 to express a preference 520 for a content item 505, to comment 525 on the content item 505, or to share 530 the content item 505 with additional users of the social networking system 140.

Referring again to FIG. 3, the social networking system 140 may send 380 the content items selected 370 by the social networking system 140 for display to the viewing user. For example, once the social networking system 140 has generated 375 a content feed, the social networking system 140 may send 380 the content feed for display to the viewing user via a group page associated with the group. In this example, the group page may be presented on a client device 110 (e.g., a mobile device) associated with the viewing user.

In some embodiments, different content item(s) may be presented to users of the social networking system 140 who are members of the same group. For example, in embodiments in which the social networking system 140 computes 360 similarity scores associated with candidate content items based in part on information stored in association with a profile of the viewing user, different content items may be selected 370 for presentation to different users of the social networking system 140 who are members of the same group. As an additional example, in embodiments in which candidate content items may be identified 355 based at least in part on frequency caps, the social networking system 140 may select 370 different content items for presentation to different users of the social networking system 140 who are members of the same group based on the frequency with which the content items previously were presented to the users.

Alternatively, the social networking system 140 may present the same content item(s) to users of the social networking system 140 who are members of the same group. For example, in embodiments in which the social networking system 140 generates 375 a content feed and includes the content item(s) selected 370 by the social networking system 140 in the content feed, the social networking system 140 may associate the content feed with the group. In this example, the same content feed is presented to all members of the group in response to receiving 345 a request from each of the members to access a group page associated with the group.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
retrieving information describing a plurality of objects maintained in a social networking system, the plurality of objects comprising a group having a plurality of members, each member being a user of the social networking system, wherein the group is created by an administrator member of the plurality of members, and wherein the group comprises a group page dedicated to the group;
identifying a set of objects of the plurality of objects having at least a threshold measure of similarity to the group based at least in part on the information describing the plurality of objects maintained in the social networking system;
extracting a set of data associated with one or more of the group and the set of objects having at least the threshold measure of similarity to the group, the set of data extracted from the information maintained in the social networking system;
accessing a hierarchical classification system comprising a plurality of levels arranged in order of increasing specificity, the plurality of levels arranged based at least in part on a set of topics corresponding to each of the plurality of levels, the set of topics associated with one or more of the plurality of objects;
comparing the set of data with the set of topics corresponding to each of the plurality of levels comprising the hierarchical classification system;
determining one or more topics associated with the group based at least in part on the comparing;
receiving a request to present content to a viewing user of the social networking system, the viewing user being a member of the group;

computing a similarity score for each of a set of candidate content items eligible for presentation to the viewing user, the similarity score computed based at least in part on a measure of similarity between a topic associated with each of the set of candidate content items and the one or more topics associated with the group;

ranking the set of candidate content items based at least in part on the similarity score computed for each of the set of candidate content items;

selecting a content item from the set of candidate content items based at least in part on the ranking; and sending the content item for display to the viewing user on the group page.

2. The method of claim 1, further comprising:

receiving information describing one or more actions performed by one or more members of the group in the social networking system.

3. The method of claim 2, wherein the information describing the plurality of objects maintained in the social networking system comprises the information describing the one or more actions performed by the one or more members of the group in the social networking system.

4. The method of claim 1, wherein extracting the set of data associated with one or more of the group and the set of objects having at least the threshold measure of similarity to the group comprises:

extracting one or more keywords associated with a page maintained in the social networking system having at least the threshold measure of similarity to the group from the information describing the plurality of objects maintained in the social networking system.

5. The method of claim 1, wherein extracting the set of data associated with one or more of the group and the set of objects having at least the threshold measure of similarity to the group comprises:

extracting one or more keywords associated with an additional group maintained in the social networking system having at least the threshold measure of similarity to the group from the information describing the plurality of objects maintained in the social networking system.

6. The method of claim 1, wherein the set of data associated with one or more of the group and the set of objects having at least the threshold measure of similarity to the group comprises a keyword included in the information maintained in the social networking system.

7. The method of claim 1, wherein the one or more topics associated with the group correspond to different levels comprising the hierarchical classification system.

8. The method of claim 1, wherein identifying a set of candidate content items eligible for presentation to the viewing user comprises:

retrieving a set of targeting criteria describing a set of attributes associated with users of the social networking system eligible to be presented with each of a plurality of content items maintained in the social networking system;

retrieving one or more attributes associated with the viewing user; and identifying the set of candidate content items eligible for presentation to the viewing user from the plurality of content items, each of the set of candidate content items associated with a subset of the set of targeting criteria satisfied by the one or more attributes associated with the viewing user.

9. The method of claim 1, wherein the information describing the plurality of objects maintained in the social networking system comprises content posted to the group by a member of the group.

10. The method of claim 1, wherein sending the content item for display to the viewing user comprises:

generating a user interface comprising the content item; and sending the user interface comprising the content item for display to the viewing user via a page associated with the group maintained in the social networking system.

11. The method of claim 1, wherein identifying a set of objects of the plurality of objects having at least a threshold measure of similarity to the group based at least in part on the information describing the plurality of objects maintained in the social networking system comprises:

identifying information describing the group from the information describing the plurality of objects maintained in the social networking system;

identifying information describing each of the set of objects from the information describing the plurality of objects maintained in the social networking system;

determining a measure of similarity between the group and each of the set of objects based at least in part on the information describing the group and the information describing each of the set of objects; and identifying the set of objects of the plurality of objects having at least the threshold measure of similarity to the group based at least in part on the measure of similarity.

12. A computer program product comprising a computer readable storage medium having instructions encoded thereon that, when executed by a processor, cause the processor to:

retrieve information describing a plurality of objects maintained in a social networking system, the plurality of objects comprising a group having a plurality of members, each member being a user of the social networking system, wherein the group is created by an administrator member of the plurality of members, and wherein the group comprises a group page dedicated to the group;

identify a set of objects of the plurality of objects having at least a threshold measure of similarity to the group based at least in part on the information describing the plurality of objects maintained in the social networking system;

extract a set of data associated with one or more of the group and the set of objects having at least the threshold measure of similarity to the group, the set of data extracted from the information maintained in the social networking system;

access a hierarchical classification system comprising a plurality of levels arranged in order of increasing specificity, the plurality of levels arranged based at least in part on a set of topics corresponding to each of the plurality of levels, the set of topics associated with one or more of the plurality of objects;

compare the set of data with the set of topics corresponding to each of the plurality of levels comprising the hierarchical classification system;

determine one or more topics associated with the group based at least in part on the compare;

receive a request to present content to a viewing user of the social networking system, the viewing user being a member of the group;

compute a similarity score for each of a set of candidate content items eligible for presentation to the viewing user, the similarity score computed based at least in part on a measure of similarity between a topic associated with each of the set of candidate content items and the one or more topics associated with the group;

rank the set of candidate content items based at least in part on the similarity score computed for each of the set of candidate content items;

select a content item from the set of candidate content items based at least in part on the ranking; and send the content item for display to the viewing user on the group page.

13. The computer program product of claim 12, wherein the computer readable storage medium further has instructions encoded thereon that, when executed by the processor, cause the processor to:

receive information describing one or more actions performed by one or more members of the group in the social networking system.

14. The computer program product of claim 13, wherein the information describing the plurality of objects maintained in the social networking system comprises the information describing the one or more actions performed by the one or more members of the group in the social networking system.

15. The computer program product of claim 12, wherein extract the set of data associated with one or more of the group and the set of objects having at least the threshold measure of similarity to the group comprises:

extract one or more keywords associated with a page maintained in the social networking system having at least the threshold measure of similarity to the group from the information describing the plurality of objects maintained in the social networking system.

16. The computer program product of claim 12, wherein extract the set of data associated with one or more of the group and the set of objects having at least the threshold measure of similarity to the group comprises:

extract one or more keywords associated with an additional group maintained in the social networking system having at least the threshold measure of similarity to the group from the information describing the plurality of objects maintained in the social networking system.

17. The computer program product of claim 12, wherein the set of data associated with one or more of the group and the set of objects having at least the threshold measure of similarity to the group comprises a keyword included in the information maintained in the social networking system.

18. The computer program product of claim 12, wherein the one or more topics associated with the group correspond to different levels comprising the hierarchical classification system.

19. The computer program product of claim 12, wherein identify a set of candidate content items eligible for presentation to the viewing user comprises:

retrieve a set of targeting criteria describing a set of attributes associated with users of the social networking system eligible to be presented with each of a plurality of content items maintained in the social networking system;

retrieve one or more attributes associated with the viewing user; and identify the set of candidate content items eligible for presentation to the viewing user from the plurality of content items, each of the set of candidate content items associated with a subset of the set of targeting criteria satisfied by the one or more attributes associated with the viewing user.

20. The computer program product of claim 12, wherein the information describing the plurality of objects maintained in the social networking system comprises content posted to the group by a member of the group.

21. The computer program product of claim 12, wherein send the content item for display to the viewing user comprises:

generate a user interface comprising the content item; and send the user interface comprising the content item for display to the viewing user via a page associated with the group maintained in the social networking system.

22. The computer program product of claim 12, wherein identify a set of objects of the plurality of objects having at least a threshold measure of similarity to the group based at least in part on the information describing the plurality of objects maintained in the social networking system comprises:

identify information describing the group from the information describing the plurality of objects maintained in the social networking system;

identify information describing each of the set of objects from the information describing the plurality of objects maintained in the social networking system;

determine a measure of similarity between the group and each of the set of objects based at least in part on the information describing the group and the information describing each of the set of objects; and identify the set of objects of the plurality of objects having at least the threshold measure of similarity to the group based at least in part on the measure of similarity.

23. A method comprising:

retrieving information maintained in a social networking system describing a group, the group having a plurality of members, each member being a user of the social networking system, wherein the group is created by an administrator member of the plurality of members, and wherein the group comprises a group page dedicated to the group;

extracting a set of data associated with the group from the information maintained in the social networking system;

accessing a hierarchical classification system comprising a plurality of levels arranged in order of increasing specificity, the plurality of levels arranged based at least in part on a set of topics corresponding to each of the plurality of levels, the set of topics associated with one or more objects maintained in the social networking system;

comparing the set of data with the set of topics corresponding to each of the plurality of levels comprising the hierarchical classification system;

determining one or more topics associated with the group based at least in part on the comparing;

receiving a request to present content to a viewing user of the social networking system, the viewing user being a member of the group;

identifying a set of candidate content items eligible for presentation to the viewing user;

computing a similarity score for each of the set of candidate content items based at least in part on a measure of similarity between the topic associated with the candidate content item and the one or more topics associated with the group;

ranking the set of candidate content items based at least in part on the similarity score computed for each of the set of candidate content items; and selecting a content item from the set of candidate content items based at least in part on the ranking.

24. The method of claim 23, further comprising:

generating a user interface comprising the content item selected from the set of candidate content items.

25. The method of claim 24, further comprising:

sending the user interface for display to the viewing user on the group page.

* * * * *